US008757399B2

(12) United States Patent
Wolfbauer

(10) Patent No.: US 8,757,399 B2
(45) Date of Patent: Jun. 24, 2014

(54) FISHING ROD CARRIER AND COVER THEREFOR

(76) Inventor: Kenneth P. Wolfbauer, Marine on St. Croix, MN (US)

( * ) Notice: Subject to any disclaimer, the term of this patent is extended or adjusted under 35 U.S.C. 154(b) by 10 days.

(21) Appl. No.: 13/549,098

(22) Filed: Jul. 13, 2012

(65) Prior Publication Data

US 2013/0015151 A1  Jan. 17, 2013

Related U.S. Application Data

(60) Provisional application No. 61/507,329, filed on Jul. 13, 2011.

(51) Int. Cl.
*A47F 7/00* (2006.01)
*A47B 81/00* (2006.01)
*A01K 97/08* (2006.01)

(52) U.S. Cl.
CPC .............. *A47B 81/005* (2013.01); *A01K 97/08* (2013.01); *A47F 7/0028* (2013.01); *A47F 7/0035* (2013.01); *A47F 7/0021* (2013.01)
USPC ........................................ 211/70.8; 211/60.1

(58) Field of Classification Search
CPC ...... A01K 97/08; A01K 97/10; A47F 7/0028; A47F 5/08; A47F 7/0021; A47F 7/0035; A63B 71/0036; A63B 71/0045; A63B 71/00; A63B 55/10; A63B 55/00; A47B 81/00; A47B 81/005; B60R 9/12; A63C 11/028; A63C 11/007; D06F 57/08
USPC ............ 211/70.2, 70.6, 195, 60.1, 70.8, 70.5, 211/85.7, 198, 76.01, 87.01, 193, 192, 211/106.01; 206/443, 315.11; 224/922; 43/26, 21.2; 294/161, 159; 248/316.8, 248/224.8, 222.41, 223.21, 225.11, 230.7, 248/231.81, 231.71, 230.6, 316.7, 316.1; D22/147; D6/512, 552, 449
See application file for complete search history.

(56) References Cited

U.S. PATENT DOCUMENTS

| | | | | |
|---|---|---|---|---|
| 2,070,254 | A * | 2/1937 | Burgner | 211/70.2 |
| 2,987,109 | A * | 6/1961 | Sohmer | 294/143 |
| 2,990,865 | A * | 7/1961 | Steele | 211/70.2 |
| 3,215,181 | A * | 11/1965 | Reed | 211/70.2 |
| 3,953,033 | A * | 4/1976 | Kelly et al. | 473/268 |
| 4,014,466 | A * | 3/1977 | Wess et al. | 294/162 |
| 4,036,416 | A * | 7/1977 | Lowe | 294/143 |
| D248,347 | S * | 7/1978 | McCollum | D6/552 |
| 4,108,313 | A * | 8/1978 | Bogar, Jr. | 211/64 |
| 4,193,495 | A * | 3/1980 | Keeley | 294/143 |
| 4,230,247 | A * | 10/1980 | Lowe | 294/143 |
| 4,311,262 | A | 1/1982 | Morin | |
| 4,526,414 | A * | 7/1985 | Jones | 294/143 |
| 4,666,038 | A * | 5/1987 | Minneman | 206/315.2 |

(Continued)

*Primary Examiner* — Jennifer E Novosad
(74) *Attorney, Agent, or Firm* — James M Smedley LLC; James M. Smedley, Esq.

(57) ABSTRACT

A carrier unit for a plurality of fishing rods has a base from which first and second spaced apart legs project. First and second clip elements attach to and project from the first and second legs respectively. Each clip has a holding slot with an open end, for receiving and detachably retaining at least one of a handle portion and a rod portion of a rod assembly. The clip elements are mountable on the respective legs in approximate alignment with each other. The legs may comprise parts of first and second leg frames projecting from the base in the form of an A-frame and carrying four or more clip elements.

17 Claims, 5 Drawing Sheets

(56) References Cited

U.S. PATENT DOCUMENTS

| | | | |
|---|---|---|---|
| 4,696,122 A * | 9/1987 | Van Der Zyl | 43/21.2 |
| 4,726,141 A | 2/1988 | McBride et al. | |
| 4,779,914 A * | 10/1988 | Friedline | 294/143 |
| D307,087 S * | 4/1990 | Gibson et al. | D6/552 |
| D320,305 S * | 10/1991 | Silks | D3/259 |
| 5,154,467 A * | 10/1992 | Lanius et al. | 294/160 |
| 5,209,539 A * | 5/1993 | Atalay | 294/143 |
| 5,234,114 A * | 8/1993 | Coffey | 211/70.2 |
| 5,450,957 A * | 9/1995 | Erb | 206/315.11 |
| D372,144 S * | 7/1996 | Selby | D6/468 |
| 5,803,519 A * | 9/1998 | Daigle | 294/159 |
| 5,979,102 A * | 11/1999 | Sagryn | 43/21.2 |
| 6,000,542 A * | 12/1999 | Smith | 206/349 |
| 6,032,999 A * | 3/2000 | York et al. | 294/143 |
| 6,179,256 B1 * | 1/2001 | Utterback | 248/166 |
| 6,464,090 B1 * | 10/2002 | Martinez | 211/70.2 |
| 6,607,077 B2 * | 8/2003 | Feeney | 206/315.7 |
| 6,637,707 B1 * | 10/2003 | Gates et al. | 248/224.7 |
| D486,779 S * | 2/2004 | Alberti | D12/406 |
| 8,047,413 B2 * | 11/2011 | Arajakis | 224/577 |
| 2002/0104768 A1 * | 8/2002 | Nevarez | 206/315.11 |
| 2010/0089849 A1 * | 4/2010 | Sheppard et al. | 211/85.7 |
| 2012/0037579 A1 * | 2/2012 | Muldoon et al. | 211/64 |

* cited by examiner

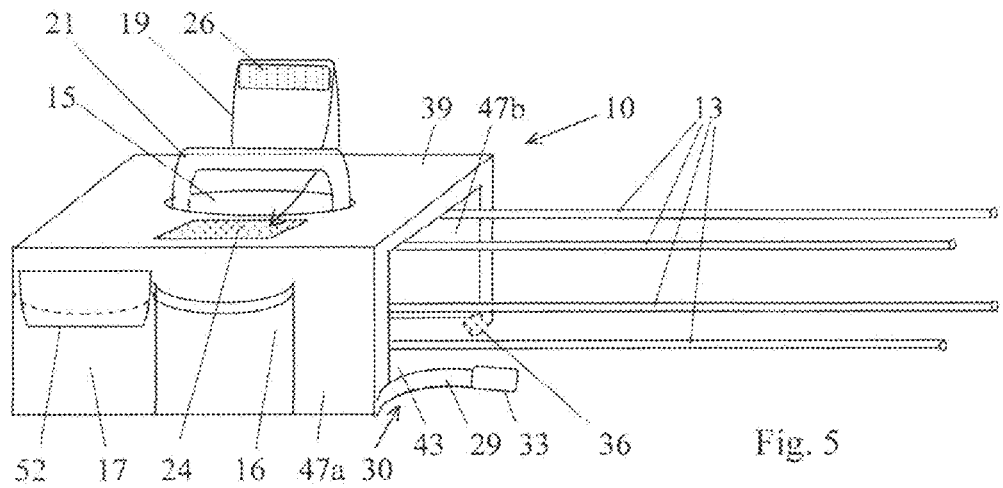
Fig. 5
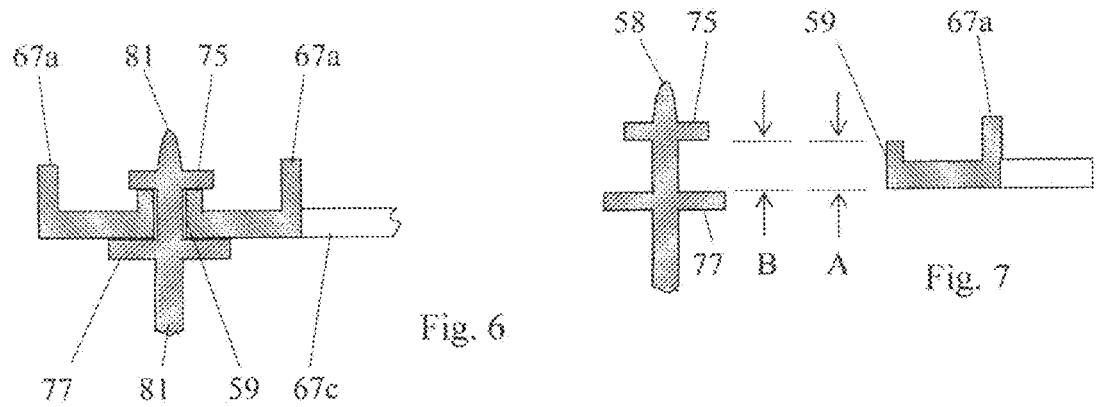
Fig. 6
Fig. 7
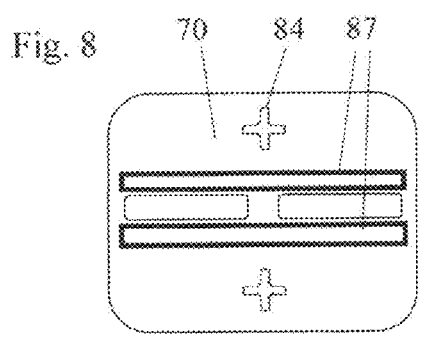
Fig. 8

FISHING ROD CARRIER AND COVER THEREFOR

CROSS-REFERENCE TO RELATED APPLICATIONS

This is a regular application filed under 35 U.S.C. §111(a) claiming priority, under 35 U.S.C. §119(e)(1), of provisional application Ser. No. 61/507,329, previously filed Jul. 13, 2011, under 35 U.S.C. §111(b).

BACKGROUND OF THE INVENTION

Fishing rods with attached reels are commonplace items for fishing activities. Referring to FIG. 3, a rod assembly 40 includes a flexible rod 13, a handle 51 for a person to grasp, and an attachment feature at 76 and typically integrated into handle 51 for mounting a reel 73. Each handle 51 has a rod end to which the rod 13 is affixed, and a butt end opposite the rod end.

A rod assembly 40 to be usable must have a reel 73 attached by the attachment feature 76 to assembly 40. The reel includes a rotating spool for storing fishing line and a handle for rotating the spool when retrieving the fishing line. Usually, a reel 73 is mounted on a rod assembly for long periods, and is transported as a part of the rod assembly. A rod assembly 40 with a reel attached may weigh in the 2-4 lb. range.

Transporting and storing assemblies is sometimes a problem. The rods are long and flexible. The reels are somewhat fragile. The handles 51 are typically at the ends of the assemblies, so carrying them by the handles 51 is awkward.

If a person is carrying more than one rod assembly 40, the transport problem becomes even more intractable. Assemblies 40 can be only held safely by the handles because of the danger of inadvertently snagging one's self on a hook and the flexibility of the rods 13. It is difficult to carry more than one rod assembly 40 in one hand because the fishing line and hooks can become tangled with each other.

When fishing from a boat, one prefers to not lay rod assemblies 40 directly on the bottom of the boat, where they may be stepped on inadvertently, or become entangled with other gear. When fishing from the shore, one prefers to not set a rod assembly on the ground, which may allow sand, dirt, etc. to contaminate reel 73.

Storing rod assemblies 40 is also inconvenient. Leaning them in a corner subjects them to damage. Hanging them vertically likely places the hooks close to passing people and pets. When a person takes a group of rod assemblies 40 on a fishing expedition, the assemblies will have to be collected one at a time, which is time-consuming, and may result in one being inadvertently left behind. A better way is to semi-permanently collect a set of rod assemblies.

Protecting rod assemblies 40 from contamination and mechanical impact will prolong their lives. Providing protection against such events is, therefore useful.

For all these reasons, a device that can support, organize and store a number of rod assemblies 40, and that allows easy transport of a number of rod assemblies 40 will be helpful to those who engage in fishing.

BRIEF DESCRIPTION OF THE INVENTION

These problems are addressed by a rod carrier unit as described. The unit includes a base having a lower side for resting on or attaching to a support surface, and an upper side. The unit further includes first and second spaced apart legs attached to the base and projecting from the base's upper side and terminating in an end.

First and second clip elements attach to and project from the first and second legs respectively. Each clip element has a holding slot with an open end, for receiving and detachably retaining at least one of a handle portion and a rod portion of a rod assembly. The clip elements are mountable on or integral with the respective legs and can be placed in, or are in, approximate vertical alignment with each other.

In a preferred version of the invention, each leg has a first attachment feature and each clip has a second attachment feature, wherein the first and second attachment features mate to secure the clip to the leg. One type of first attachment feature comprises an aperture in the leg, and the second attachment feature on a mating clip element comprises a projection that fits into and is retained by the aperture.

A further preferred version has in at least one leg, at least one first attachment feature that comprises a slot extending along the leg. The slot has spacing from the base similar to that of the first attachment feature on the second leg, to place them in approximate alignment with each other. The mating clip element projection fits into and forms an interference fit with the slot, so that a user can slide the clip element to a plurality of positions in the slot.

The legs may comprise parts of a first leg frame having first and second leg portions serving as the first and second legs. The first leg frame also includes a first strut portion connected between similar ends of the leg portions, for attaching to the base. A first handle portion connects between similar ends of the leg portions and spaced from the strut portion. The strut portion attaches the leg frame to the base with the leg portions projecting away from the base.

The rod carrier unit may further include a second leg frame comprising first and second leg portions serving as first and second legs of the second frame. A second strut portion connected between similar ends of the second frame's leg portions, and is for attaching to the base. A second handle portion connects between similar ends of the leg portions and spaced from the second strut portion.

The unit comprises the first and second strut portions attached to the base at spaced apart positions, and the first and second handle portions fastened to each other. The two first leg portions form an A-frame structure projecting from the base. The two second leg portions form a second A-frame structure projecting from the base. The clip elements project outwardly from the leg elements.

The base may include a well for receiving a storage box.

BRIEF DESCRIPTION OF THE DRAWINGS

FIG. 5 is side angle perspective view of an optional cover for the fishing rod carrier unit.

FIG. 6 is a cross section view of a portion of a leg in which a clip element is installed.

FIG. 7 shows important dimensions for a slot in the leg and the clip element.

FIG. 8 is a top elevation view of the fishing rod carrier unit's base, with the legs detached therefrom.

DESCRIPTION OF THE PREFERRED EMBODIMENTS

Figure 1:
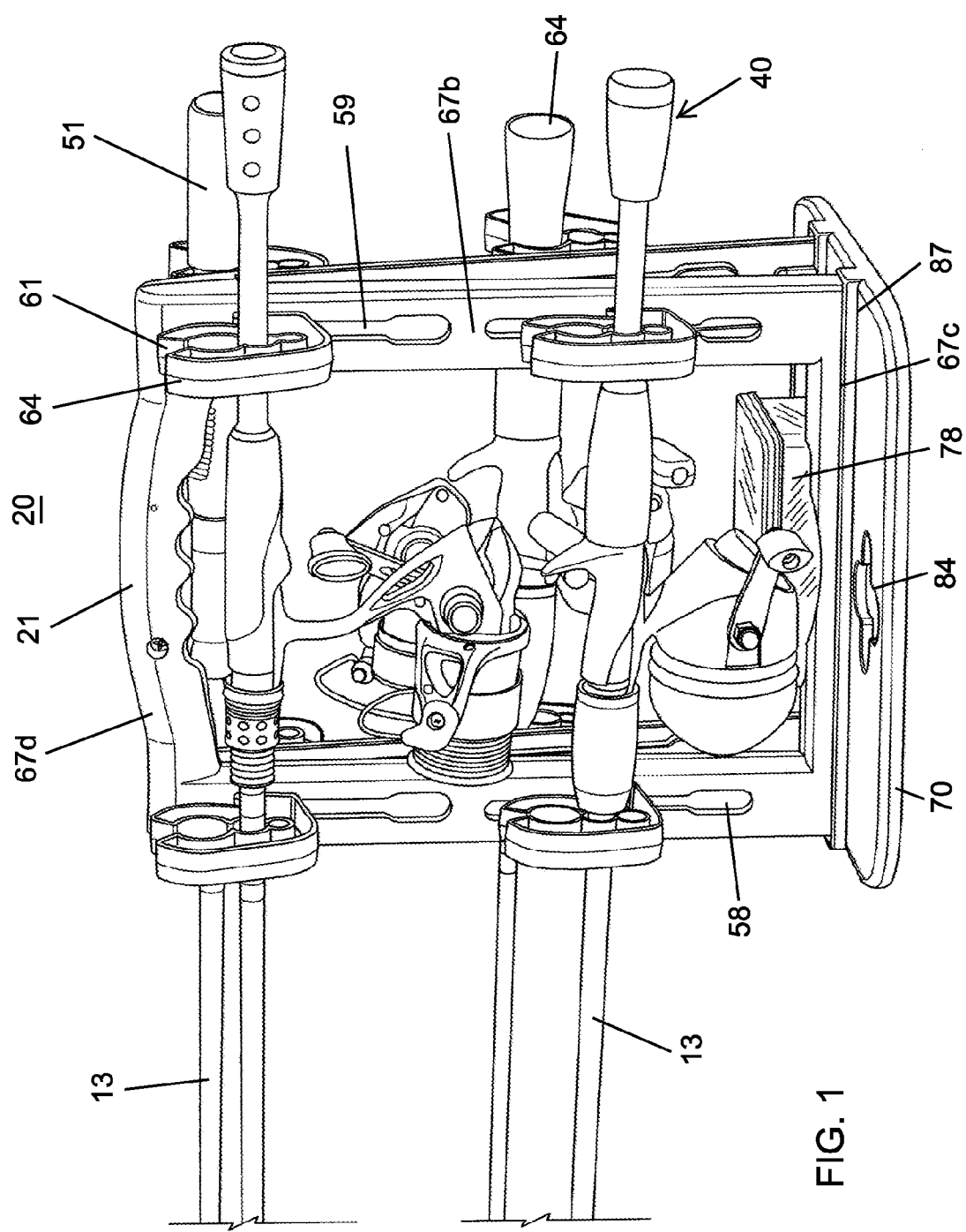
FIG. 1 is a side angle perspective view of the assembled fishing rod carrier unit.
Figure 2:
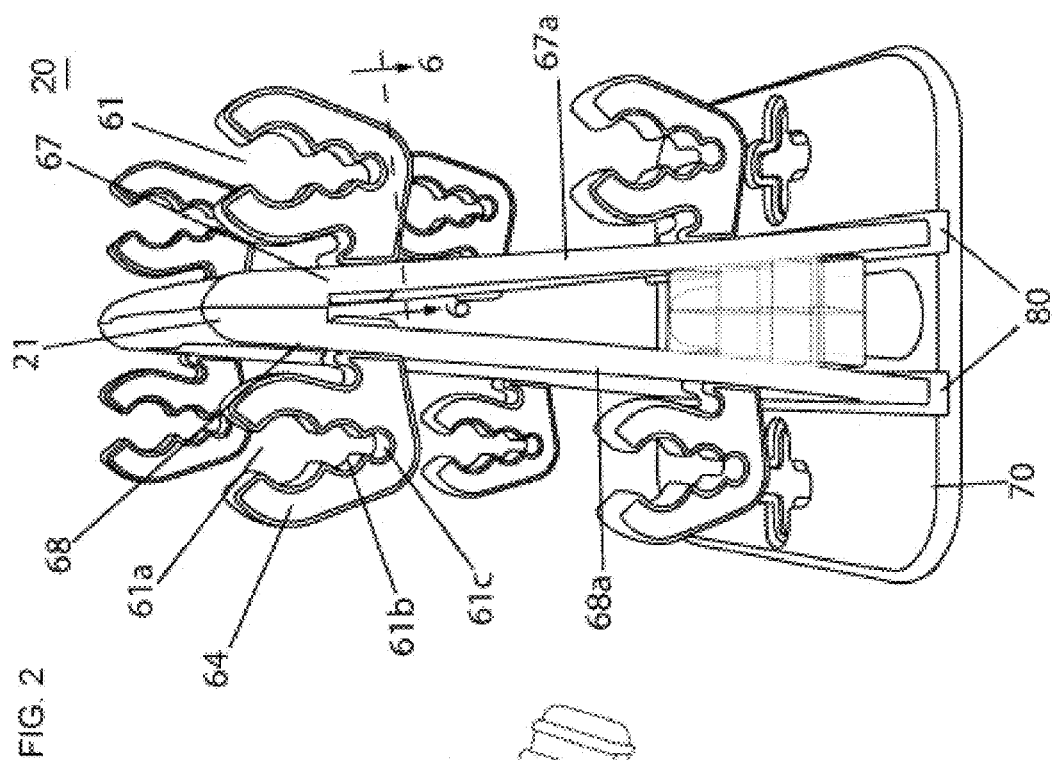
FIG. 2 is an end perspective view of the assembled fishing rod carrier unit.

FIGS. 1 and 2 show a version of a carrier unit 20 capable of holding four rod assemblies 40. Carrier unit 20 comprises a base 70 having an upper side visible in FIGS. 1 and 2, and a lower side for allowing carrier 20 to rest stably on a surface.

Carrier unit 20 also has a first leg frame 67 and a second leg frame 68. Frames 67 and 68 are substantially identical to each other. Using leg frame 67 as an example, it has a first leg portion or leg 67a, a second leg portion or leg 67b, a handle portion 67d connecting handle ends of leg portions 67a and 67b, and a strut portion 67c connecting attachment ends of leg portions 67a and 67b opposite the handle ends thereof. Strut portion 67c has dimensions that permit it to fit into one of troughs 80 in base 70 as does the strut portion 68c (see FIG. 9) of leg frame 68.

Figure 9:
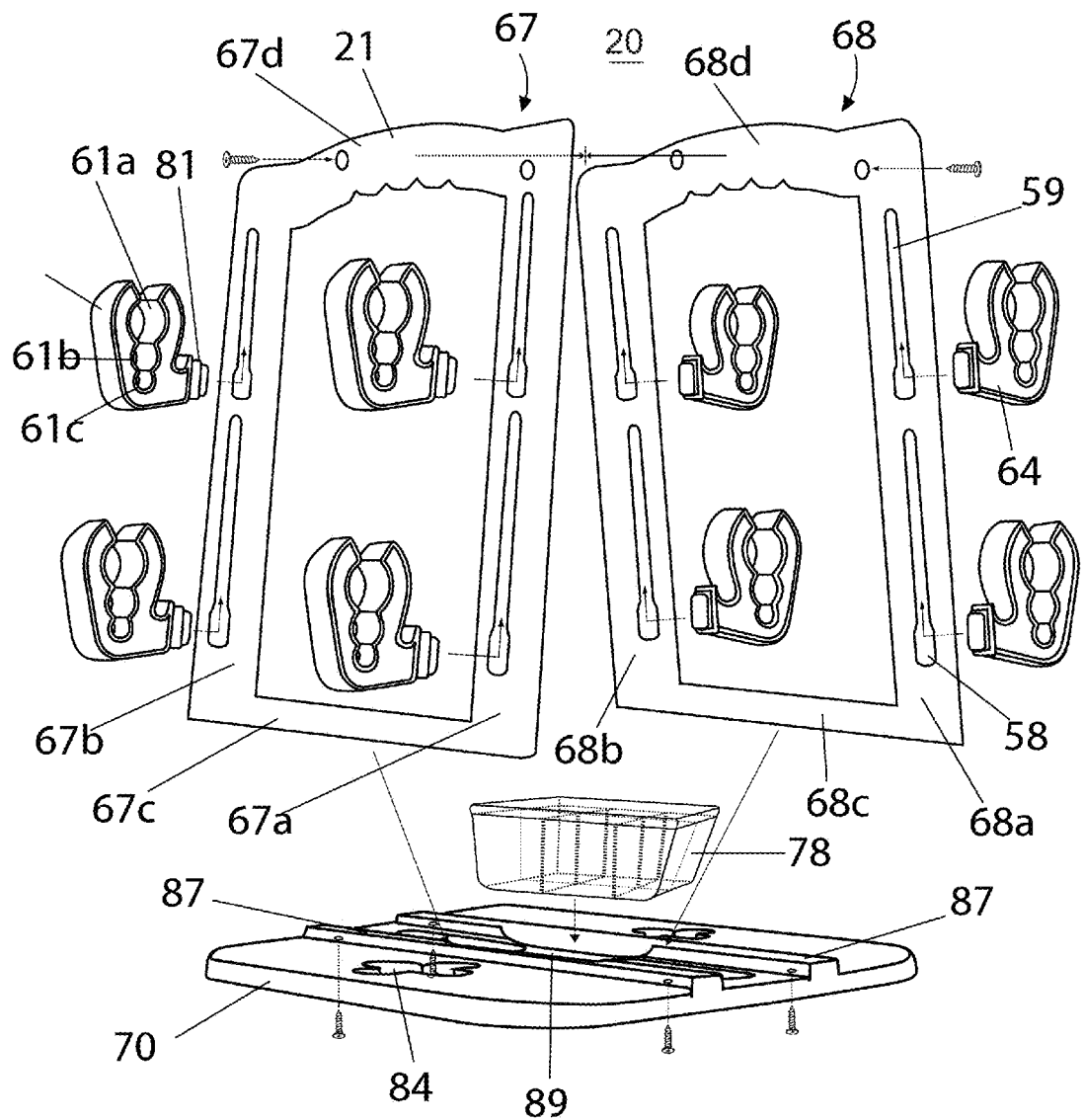
FIG. 9 is an exploded view of the carrier unit, showing how the various elements thereof fit together.

Screws shown in the exploded view of FIG. 9 attach strut portions 67c to the base 70 within a trough 80 in a way causing leg portions 67a and 67b to project away from base 70. Screws also connect the strut portion 68c of leg frame 68 to base 70 within a similar adjacent trough. Screws also connect the handle portion 67d to the similar handle portion 68d to form handle 21.

FIG. 2 shows an assembled carrier unit 20, showing the leg portions 67a, 67b, 68a, 68b of frames 67 and 68 forming an A-frame structure that resists distortion even with material comprising unit 20 that has relatively low elastic modulus. Forming leg portions 67a, 67b, 68a, 68b with U-channel cross sections adds stiffness without adding much weight or cost.

A storage box 78 having a box attachment feature may be mounted in a well 89 formed in the space between strut portion 67c and the similar strut portion of frame 68. This well forms a base attachment feature that cooperates with the storage box attachment feature to retain the storage box on base 70, and also to allow removing box 78. In one version, well 89 grips the walls of box 78 with an interference fit to provide the retention feature.

Base 70 may include a storage feature 84 allowing a user to mount carrier 20 on a surface such as a wall for example. In one form, each storage feature 84 comprises crossed slots with an opening at the crossing point larger than either slot's width. A screw inserted part way into a wall with a head smaller than the crossing point opening but larger than the slots' width allows carrier 20 to be temporarily attached to the wall, a boat deck, or a dock. Other types of storage features are possible as well.

Leg portions 67a and 67b each have a plurality of first clip attachment features, comprising in this version apertures such as the four attachment slots 59 extending along parts of the lengths of leg portions 67a and 67b, but may also comprise for example, projections. The two attachment slots 59 in first leg portion 67a may be positioned in approximate horizontal alignment with a pair of similar attachment slots 59 on the second leg portion 67b. By "in alignment" is meant that for a particular slot 59 on leg portion 67a there is a slot 59 on leg portion 67b that is similarly spaced from base 70. One should note that first attachment features may take a variety of forms.

Each slot 59 shown here has an enlargement 58 at the end thereof with a width larger than found along the remainder of the slot 59. The enlargement 58 allows a projection 81 of a clip element 64 to be described below, to be inserted into and slipped along a slot 59 of an individual leg portion 67a, 67b.

An individual rod assembly 40 is to be held by a pair of clip elements or clips 64 as shown in FIG. 1. Each slot 59 is designed to accept a projection 81 of a single clip element 64, which can slide within and frictionally maintain any one of a range of desired positions within the slot 59 involved.

Each clip element 64 has a second attachment feature comprising in a preferred embodiment, a projection 81. This second attachment feature, whatever its structure, mates with one of the first attachment features such as slot 59 to secure the clip element 64 to leg element 67a or 67b.

Figure 3:
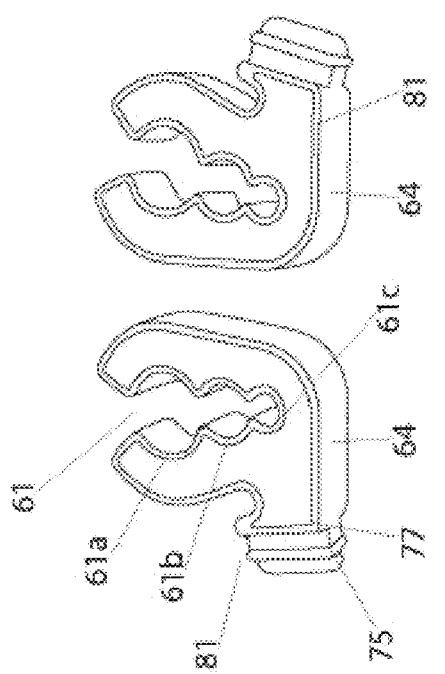
FIG. 3 is perspective view of a pair of clip elements forming a part of the carrier unit.

Clip elements 64 as shown in FIG. 3 are exemplary. Each clip 64 has a rod holding feature comprising a holding slot 61 designed for receiving and detachably retaining a rod assembly 40. By "receiving and detachably retaining" is meant that a rod assembly 40 can be inserted into and removed from slots 61 with force easily provided by a human, and yet is held with sufficient force to prevent inadvertently detaching during normal handling.

Each rod assembly 40 is to be held by two clips 64 on separate leg portions 67a and 67b. For transport, the expectation is that clips 64 holding a single rod assembly 40 will be in approximate alignment with each other. By "in approximate alignment with each other" is meant that when a rod assembly 40 is inserted in the slots of two clips 64 held on two legs 67a and 67b for example, the rod assembly 40 is positioned approximately parallel to base 70. It may also be convenient to in certain circumstances, hold a rod assembly 40 with clips that are not in approximate alignment with each other.

As FIG. 1 shows, one clip 64 on one of legs 67a and 67b holds one of the handle, ferrule, and rod of a rod assembly 40. The clip 64 on the other of legs 67a and 67b holds another of the handle, ferrule, and rod of that rod assembly 40. Clip elements 64 hold a rod assembly 40 securely, and at the same time have dimensions that allow a human to easily remove or detach rod assembly 40 from slots 61.

A preferred version of a clip 64 has a slot 61 with a series of concave, arcuate, slot edge shapes 61a, 61b, and 61c with decreasing radii of curvature from the open to the closed end of holding slot 61 along each edge of holding slot 61. The differing radii and the inherent flexibility or resilience of the material from which clip 64 is made, allows a user to insert a rod assembly 40 at virtually any point along the length of assembly 40 into clip 64 to securely retain the rod assembly 40. Such a clip 64 can form a detent relationship with the rod assembly 40 at any of the various diameters or sizes along the length of a rod assembly 40 that securely retains assembly 40, and at the same time allows the user to remove assembly 40 from clip 64. The slot edge shapes and dimensions, and the resiliency of clip 64, allow clip 64 to receive and detachably retain various sizes of rod assembly handles, ferrules, and rods.

Thus, as an example, edge portions 61a may receive and detachably retain the handle portion of an assembly 40. Edge portion 61b may receive and detachably retain the ferrule portion of an assembly 40. Edge portion 61c may receive and detachably retain the rod portion of an assembly 40. Clips 64 can accommodate a wide variety of rod assembly 40 sizes.

A preferred version of the clip element 64 second attachment feature comprises projection 81. This second attachment feature mates with one of the first attachment features (slot 59) to secure the clip element 64 to leg element 67a or 67b.

The cross section shown in FIG. 6 shows projection 81 to include an outer flange 75 and an inner flange 77 that define between them a channel. Projection 81 fits into slot 59 through an enlargement 58 of slot 59, so as to allow clip 64 to enter and slide within slot 59. Flange 75 should be small enough to pass through enlargement 58. Flange 77 should be too large to pass through enlargement 58.

Friction between flanges 75 and 77, and the edge of slot 59, should be sufficient to prevent a force that is below a preselected level and that is urging clip 64 to slide within slot 58, from doing so. This preselected force level should be substantially greater than half the weight of a rod assembly 40, but small enough to allow a user to easily slide clip 64 to any desired position along slot 58. In one version of carrier 20, this force is around 10 lb. (4.55 kg.), but a resisting force of perhaps anywhere between 8 lb. (3.64 kg.) and 15 lb. (6.82 kg.) is acceptable.

The section views of FIGS. 6 and 7 show details of the interface of a slot 59 and a clip projection 81. FIGS. 6 and 7 show how the dimensions of the slot 59 edge and the spacing between flanges 75 and 77 cooperate to produce the frictional force that resists sliding of clip 64 in slot 58. Dimension B of FIG. 7 is the spacing between flanges 75 and 77 when unstressed. Dimension A is the thickness of the edge of slot 59 when unstressed. There should be a small interference fit between each edge of slots 59 and the spacing between flanges 75 and 77. For a relatively flexible, low modulus material comprising leg frame 67a and clips 64, an interference fit of 0.004 in (0.1 mm.) is sufficient. Depending on the material, interface configuration, and the surface finish at the interface, any interference fit between 0.002 in. and 0.006 in. (0.05-0.15 mm.) may be successful.

Leg frames 67 and 68 may comprise polyvinyl chloride (PVC) of the type having some flexibility, but yet able to resist transverse force of a few pounds with only a little deflection.

Clip elements 64 should be flexible or semi-rigid. A suitable design for clips 64 will provide a resisting force of a few pounds when inserting or removing a rod assembly 40. The gripping force of a clip element 64 should hold any portion of a rod assembly 40 securely enough to prevent inadvertently detaching from clip elements 64 during normal or even moderately rough handling. At the same time, the force required to remove a rod assembly 40 should be low enough to allow typical users to remove rod assemblies 40 with moderate force.

A mixture of PVC and polypropylene ethylene (PPE) provides such characteristics for clips 64. A relatively wide range of the ratio of the two materials in the mixture forming clips 64 will usually be successful as the constituent thereof. The shape and dimensions of the clip elements 64 impact these design aspects as well.

As an example, one successful design has flat beveled surfaces at the open end of slot 61 angled at approximately 75° to each other. Such a clip element 64 may have stiffness such that a force of approximately 8 lb. applied at the line where curve 61a intersects the adjacent bevel spreads the outermost points of slots 61 by approximately 0.25 in. These parameters allow inserting and removing a rod handle 51 into a clip 64 with an appropriately low level of force, and at the same time provides for securely holding a rod assembly 41 of a typical weight. Of course, the dimensions of a clip 64 having any desirable set of parameters should accommodate a substantial range of rod handle 51 diameters.

Figure 4:
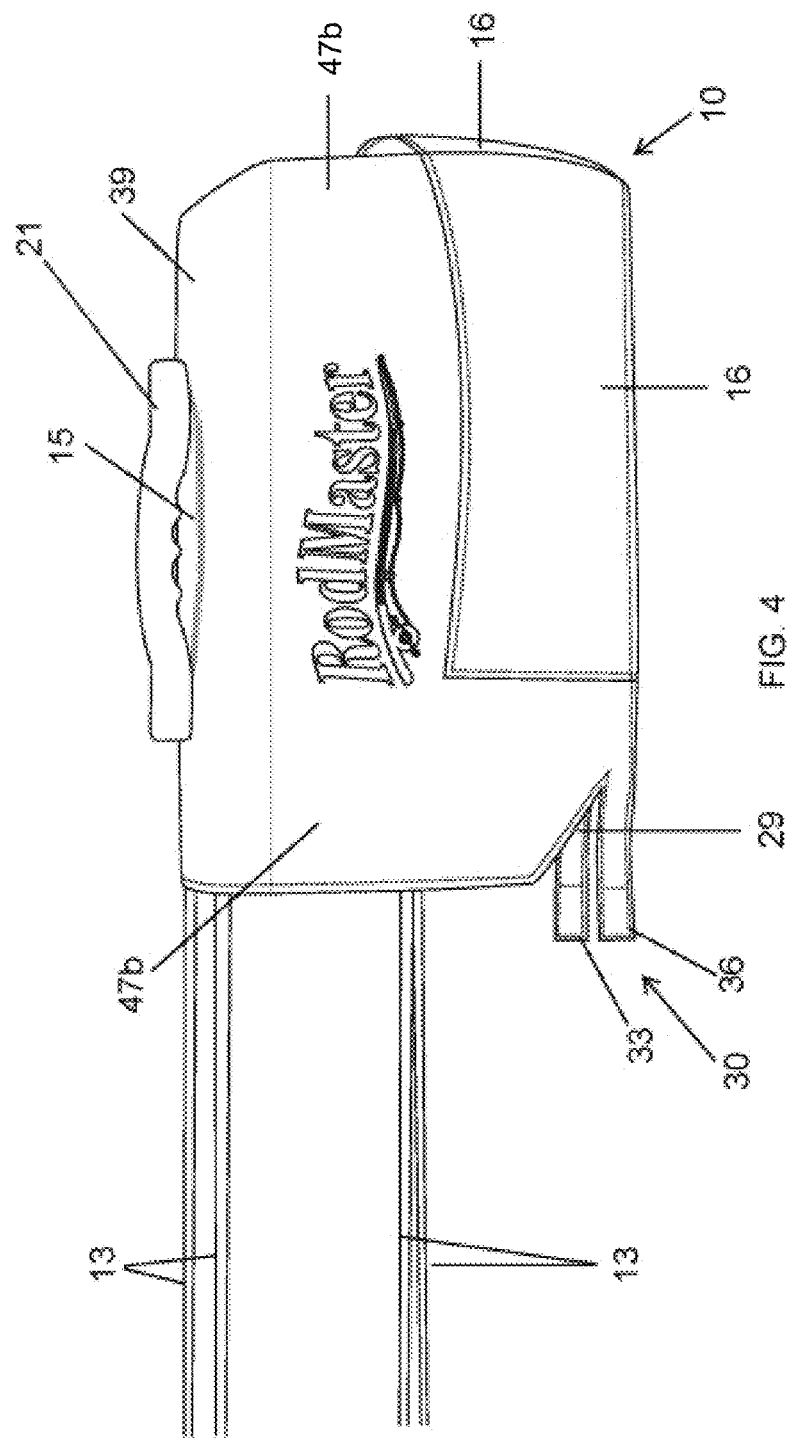
FIG. 4 is a first side angle perspective view of an optional cover for the fishing rod carrier unit.

FIGS. 4 and 5 show a cover 10 that protects reels 73 forming part of the rod assemblies 40 from snagging on or bumping into adjacent surfaces of all types, possibly damaging them. Cover 10 comprises fabric such as canvas or other durable material which can be sewn into the substantially parallelepiped shape shown. Preferably, cover 10 has a top panel 29, side panels 47a and 47b joined at top edges to top panel 29, and an end panel 23 joined at a top edge to top panel 29 and at side edges to both the side panels 47a and 47b to enclose the carrier unit 20 at the top and on three sides. Cover 10 has an open end at 43 and opposite end panel 23 that allows rod assemblies 40 supported by carrier 20 to project outwardly from within cover 10. Cover 10 has no bottom panel.

Cover 10 has an opening 15 on top panel 39 through which handle 21 of the carrier 20 projects. FIG. 5 shows an optional fabric tab 19 that fits through handle 21 as the arrow shows and connects to top surface 39 with hook and loop pads 26 and 24. Tab 19 helps to protect the interior of cover 10.

Cover 10 has a closure tab 30 comprising strap 29 attached to the bottom of cover 10 adjacent opening 43. Tab 30 is to extend below rods 13 and close the bottom of opening 43 by mating hook and loop areas 33 and 36.

Cover 10 may have two or more pockets 16 and 17 on one or more sides 47 of cover 10. Pockets 16 and 17 may be formed of fabric similar to that used for cover 10. Pocket 16 is shown as having at least one insulated wall to keep beverage cans or sandwiches cool, although this is not specific to the function of protecting the rod assemblies 40. Pockets 16 and 17 may also have cover flaps 52 that close for example with hook and loop attachments or snaps.

A number of variations on this design are possible. For example, one rather than two leg frames may be provided. Legs could be separate elements rather than forming a part of a leg frame 67 or 68. More than two slots 58, or even one slot 58 may be provided on a leg portion. Different types of attachment between clips 64 and leg portions 67a and 67b are possible as well. Clips 64 could be integral with leg portions 67a and 67b rather than detachable. Many of these alternatives are not felt to be preferable at this time, however.

What is claimed is:

1. A rod carrier unit for fishing rod assemblies, each rod assembly having a handle portion and a rod portion, comprising:
   a) a base having a lower side for resting on a support surface, and an upper side;
   b) first and second legs, each having a bottom end removably attached to the base and projecting from the base's upper side and terminating in a top end,
   wherein each of said first and second legs are spaced apart at the bottom end, and
   wherein each of said first and second legs further comprise a plurality of vertically aligned slots; and
   c) a plurality of clip elements, each having a holding slot with an open end, for receiving and detachably retaining at least one of a handle portion and a rod portion of a rod assembly, said plurality of clip elements further comprising an attachment feature allowing for receipt into one of said vertically aligned slots selected from said plurality of vertically aligned slot such that receipt of said vertically aligned slots selected from said plurality of vertically aligned slot forms an interference fit with said vertically aligned slot such that the clip element can slide to and be retained in a plurality of positions within said vertically aligned slot, and such sliding is independent of clip elements utilized in any other vertically aligned slot of said plurality of vertically aligned slots.

2. The rod carrier unit of claim 1, including a first leg frame comprising said first and second legs, a first strut portion connected between bottom ends of the first and second legs, for attaching to the base in a removable fashion, and a first handle portion connected between top ends of the first and second legs and spaced from the strut portion.

3. The rod carrier unit of claim 2 including a second leg frame comprising first and second leg portions serving as first and second legs of the second frame, a second strut portion connected between a bottom end of the second frame's leg portions, for attaching to the base, and a second handle portion connected between a top end of the first and second leg portions of the second leg frame, wherein the first and second strut portions are removably attached to the base at spaced apart positions, and the first and second handle portions are removably fastened together.

4. The rod carrier unit of claim 3 including a third attachment feature, comprising a well, on the base's upper side and between the strut portion of said first and second leg frames respectively, and a box having a bottom surface having a fourth attachment feature mating with and detachably securing the box to the base and between the struts through an interference fit.

5. The rod carrier unit of claim 3 wherein the base further comprises a plurality of troughs in said upper side of said base, each of said troughs configured to receive the strut portion of either the first leg frame or the second leg frame in such a manner as to cause their corresponding first and second legs to project away from the base.

6. the rod carrier unit of claim 5, wherein each of said troughs has one or more channels extending from the trough through the lower side of the base, each channel configured to receive a screw for securing the strut portion of either the first leg frame or the second leg frame in the trough.

7. The rod carrier unit of claim 5 wherein insertion of said first and second leg frame into said plurality of troughs causes the first handle portion of said first leg frame and the second handle portion of said second leg frame to be proximate to one another such that the first handle portion and the second handle portion may be fastened to one another.

8. The rod carrier unit of claim 2, including a cover made of flexible material and having a top and three sides, and adapted to fit over the unit and allowing the rod, said top having an aperture through which said first handle portion is received through.

9. The rod carrier unit of claim 1, wherein each clip element of said plurality of clip elements includes an arm and a body portion, said arm and body portion each having an interior edge in facing and spaced apart relationship to thereby define the holding slot, said arm resiliently deflectable to alter the spacing between the arm and the body portion.

10. The rod carrier unit of claim 9, wherein the interior edge of at least one of the arm and the body portions includes at least two concave, arcuate, slot edge shapes each for receiving and retaining one of the handle and the rod portions of a selected rod assembly to form a detent relationship between the rod assembly and the clip element.

11. The rod carrier unit of claim 10, wherein the interior edge of at least one of the arm and the body portion includes at least two concave, arcuate, slot edge shapes with the radius of curvature of each shapes decreasing with distance from the holding slot open end.

12. The rod carrier unit of claim 11 wherein the interior edge of the arm and the interior edge of the body portion are substantially mirror images of each other.

13. The rod carrier unit of claim 1, further including a cover fitting over the rod carrier unit, said cover having a top panel, an end panel, and two side panels, all joined at edges thereof to assume a substantially parallel piped shape and to enclose the rod carrier unit on four sides.

14. The rod carrier unit of claim 1, wherein the base further comprises a storage feature for temporarily attaching the unit to a flat surface.

15. The rod carrier unit of claim 14, wherein the storage feature comprises crossed slots with an opening at the crossing point larger than either slot's width.

16. the rod carrier unit of claim 1, wherein each vertically aligned slot of said plurality of vertically aligned slots comprises an enlargement at one end of said vertically aligned slot, said enlargement being of a greater width than the remainder of the vertically aligned slot and allows for a projection of the attachment feature of one of the clip elements of said plurality of clip elements to be inserted into the vertically aligned slot.

17. The rod carrier unit of claim 16, wherein each of the attachment features of the clip elements of said plurality of clip elements comprises a first flange and a second flange, wherein said first flange is small enough to pass through said enlargement and said second flange is too large to pass through the enlargement and friction between said first flange, said second flange and an edge of the vertically aligned slot the attachment feature is inserted into causes the clip element to be movably retained therein.

* * * * *